(12) United States Patent
Meehan

(10) Patent No.: US 6,745,017 B2
(45) Date of Patent: Jun. 1, 2004

(54) TIMING RECOVERY SWITCHING FOR AN ADAPTIVE DIGITAL BROADBAND BEAMFORMING (ANTENNA DIVERSITY) FOR ATSC TERRESTRIAL DTV BASED ON A DIFFERENTIATOR

(75) Inventor: Joseph Patrick Meehan, New York City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 619 days.

(21) Appl. No.: 09/847,222

(22) Filed: May 2, 2001

(65) Prior Publication Data

US 2002/0164969 A1 Nov. 7, 2002

(51) Int. Cl.[7] .................................................. H04B 1/06
(52) U.S. Cl. ........................ 455/277.1; 455/59; 455/133; 455/272; 455/3.02; 375/355; 375/347; 375/349
(58) Field of Search ............................ 455/277.1, 277.2, 455/278.1, 101, 133, 272, 3.02, 13.2, 13.3, 208, 209, 260, 25.7, 204; 375/355, 336, 326, 365, 329, 347, 364

(56) References Cited

U.S. PATENT DOCUMENTS

| | | | | |
|---|---|---|---|---|
| 5,499,397 A | * | 3/1996 | Wadin et al. | ............. 455/277.1 |
| 5,625,652 A | * | 4/1997 | Petranovich | ................. 375/365 |
| 5,742,646 A | * | 4/1998 | Woolley et al. | ............. 375/347 |
| 5,805,242 A | * | 9/1998 | Strolle et al. | ................ 455/204 |
| 5,805,643 A | * | 9/1998 | Seki et al. | ................... 455/133 |
| 5,862,191 A | * | 1/1999 | Moridi | ........................ 375/355 |
| 6,075,408 A | * | 6/2000 | Kullstam et al. | ........... 375/329 |
| 6,304,619 B1 | * | 10/2001 | Citta et al. | ................... 375/364 |
| 6,359,944 B1 | * | 3/2002 | Curtis, III | .................... 455/257 |
| 6,411,661 B1 | * | 6/2002 | Nguyen et al. | ............. 375/336 |
| 6,545,532 B1 | * | 4/2003 | Maalej et al. | ............... 375/329 |
| 6,628,733 B1 | * | 9/2003 | Tomiyoshi et al. | ...... 455/277.1 |
| 6,690,745 B1 | * | 2/2004 | Horii et al. | ................. 375/365 |

* cited by examiner

Primary Examiner—Edward F. Urban
Assistant Examiner—Lana Le
(74) Attorney, Agent, or Firm—Michael E. Belk

(57) ABSTRACT

A synchronization system within a dual antenna receiver employs two timing recovery loops each coupled to a different antenna input. The timing error computed within each timing recovery loop is differentiated by a high pass filter and compared to a predefined threshold indicating convergence. Both sampling rates are then synchronized utilizing the timing error from whichever loop converges first. If synchronization lock for the selected loop is lost, the other loop is selected to provide timing error to both loops.

20 Claims, 3 Drawing Sheets

TIMING RECOVERY SWITCHING FOR AN ADAPTIVE DIGITAL BROADBAND BEAMFORMING (ANTENNA DIVERSITY) FOR ATSC TERRESTRIAL DTV BASED ON A DIFFERENTIATOR

TECHNICAL FIELD OF THE INVENTION

The present invention is directed, in general, to timing recovery in wireless transmission systems and, more specifically, to timing recovery within synchronization loops for receivers coupled to two or more antennae.

BACKGROUND OF THE INVENTION

Current Advanced Television Systems Committee (ATSC) receivers employ single antenna systems to receive terrestrial digital television (DTV) signals. However, terrestrial wireless signals transmitted to or from a remote station may be reflected from terrain features, fixed or mobile objects such as buildings or vehicles, or discontinuities in the atmosphere. If the reflected signal is not sufficiently absorbed or attenuated, a plurality of different propagation paths are created between the transmitter and receiver, creating a situation referred to as multipath propagation.

Various problems associated with multipath propagation, typically referred to collectively as multipath fading, may dictate throughput and other performance criteria. One suggestion for minimizing the effects of multipath fading during wireless signal transmission, set forth in the Electronics Industry Association/Tele-communications Industry Association (EIA/TIA) proposed standard ISO-2000, employs space-time spreading (STS), in which identically coded data frames are transmitted on each of two (preferably orthogonal) channels utilizing physically displaced antennae.

In a single antenna system, a synchronization loop is required within the receiver to accommodate transmit and receive data rate variances; in a multiple antennae system, a synchronization loop is still required, but multiple inputs (from each antenna) are present. There is, therefore, a need in the art for a robust synchronization mechanism employing signals from two or more antennae.

SUMMARY OF THE INVENTION

To address the above-discussed deficiencies of the prior art, it is a primary object of the present invention to provide, for use in dual antenna receiver, a synchronization system employing two timing recovery loops each coupled to a different antenna input. The timing error computed within each timing recovery loop is differentiated by a high pass filter and compared to a predefined threshold indicating convergence. Both sampling rates are then synchronized utilizing the timing error from whichever loop converges first. If synchronization lock for the selected loop is lost, the other loop is selected to provide timing error to both loops.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
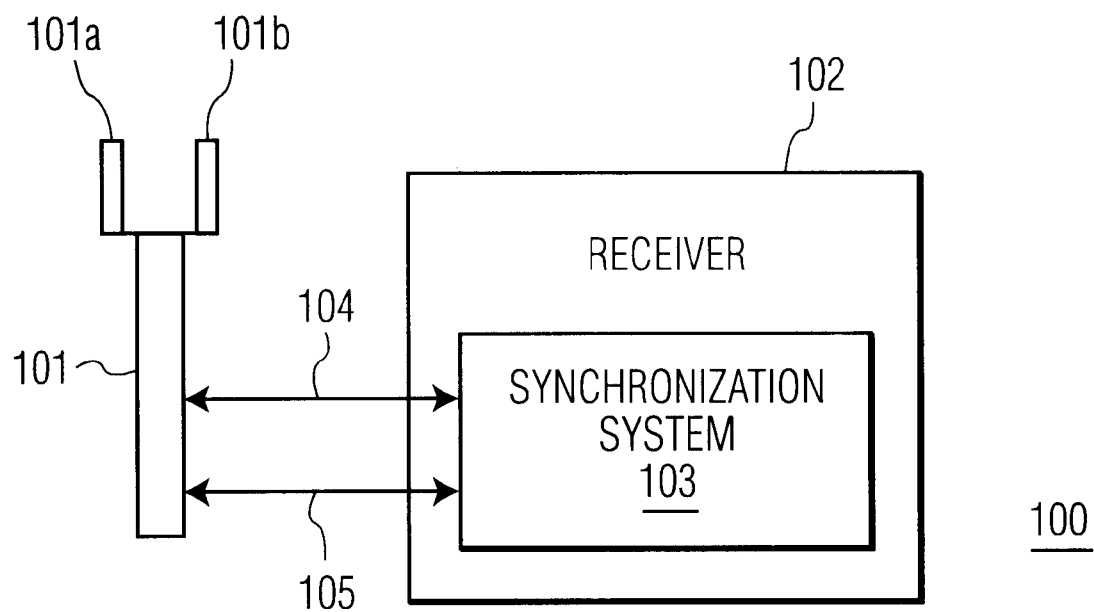
FIG. 1 depicts a multiple antennae receiver system including a differentiator-based synchronization loop for timing recovery according to one embodiment of the present invention.
Figure 2:
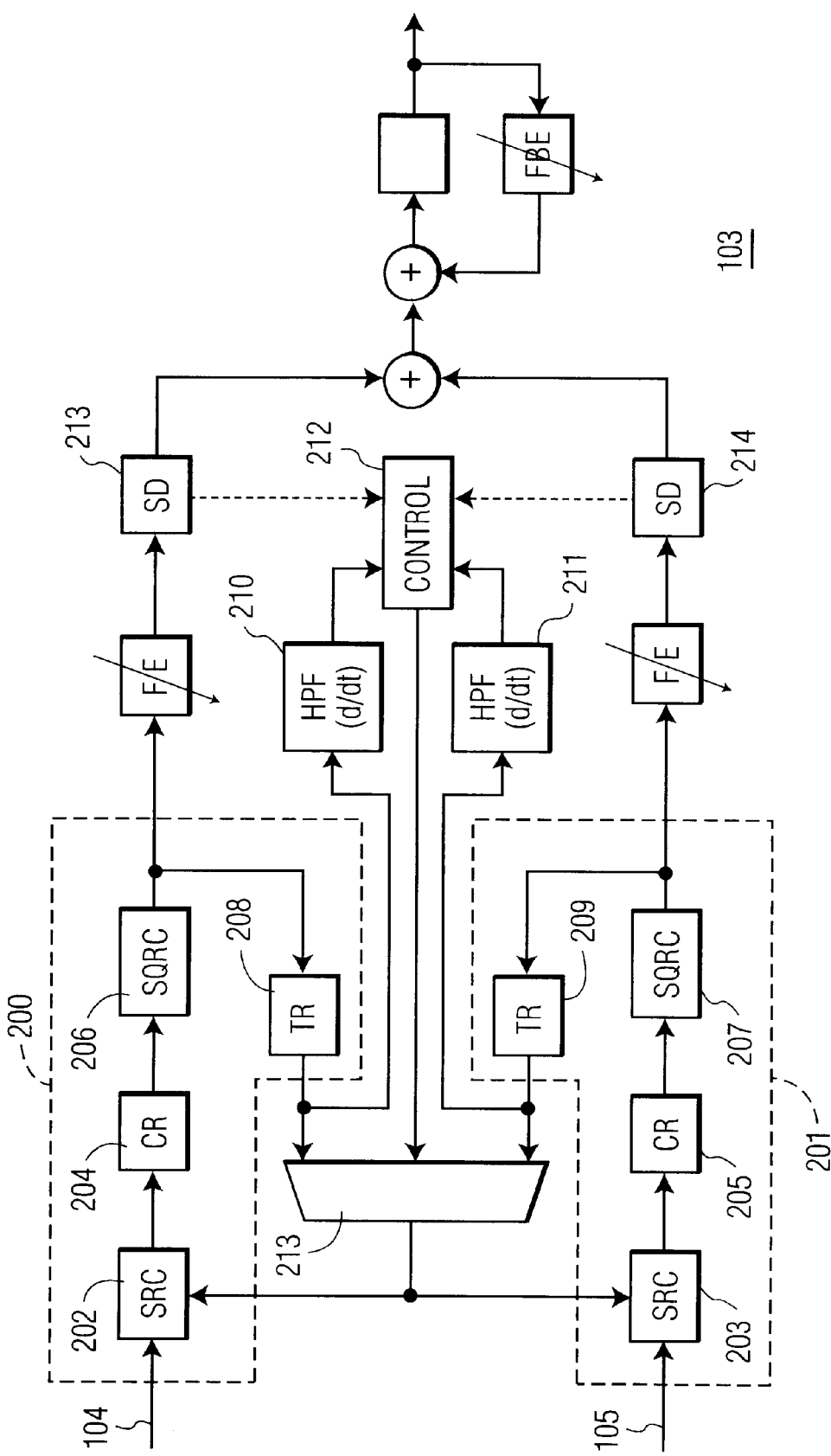
FIG. 2 illustrates in greater detail a synchronization system employing differentiator-based antenna switching for timing recovery according to one embodiment of the present invention.
Figure 3:
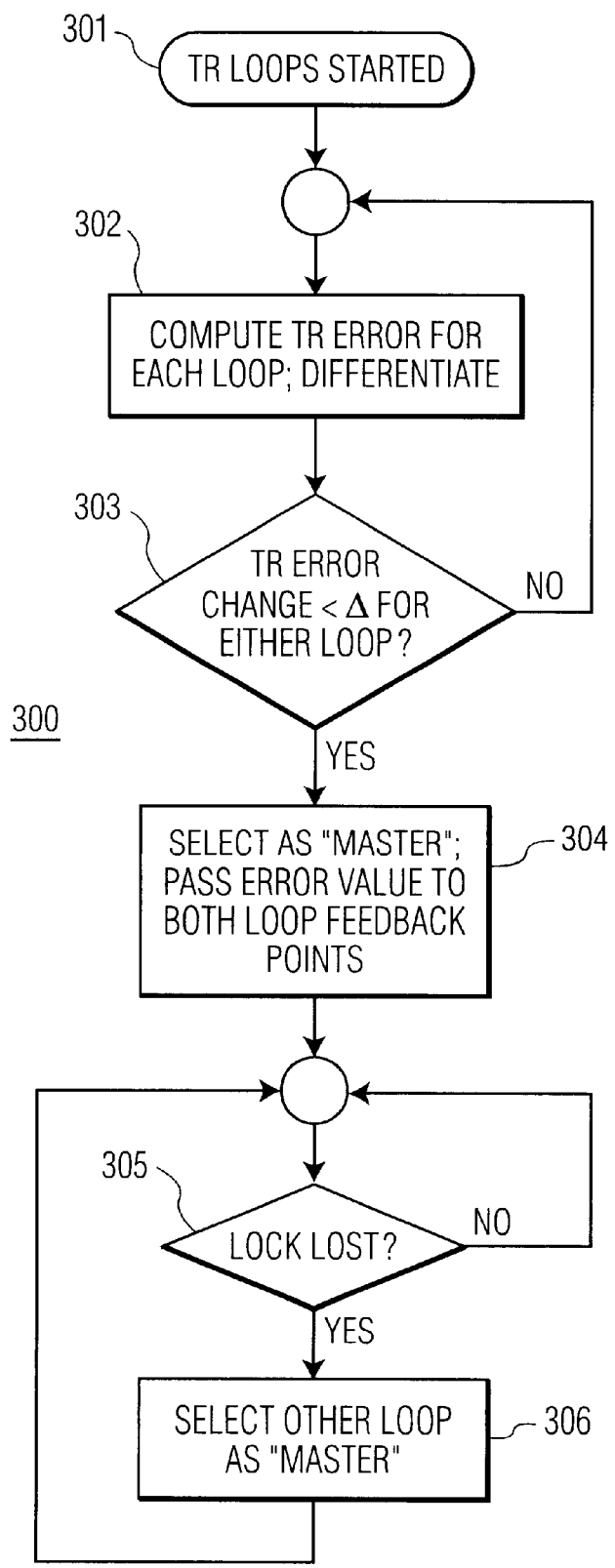
FIG. 3 is a high level flow chart for a process of differentiator-based antenna switching for timing recovery according to one embodiment of the present invention.

FIGS. 1 through 3, discussed below, and the various embodiment used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a multiple antennae receiver system including a differentiator-based synchronization loop for timing recovery according to one embodiment of the present invention. Receiver system 100 includes an antenna array 101 having physically displaced antennae 101a and 101b. Rather than being spaced closely together (e.g., on the order of half a wavelength) for array gain, antennae 101a and 101b are spaced far enough apart to so that received signals fade (almost) independently.

Antenna array 101 is coupled to a receiver 102, a digital television receiver in the exemplary embodiment, receiving separate inputs 104, 105 from antennae 101a and 101b. The present invention may also be employed for any receiver such as, for example, a broadband wireless Internet access receiver. Regardless of the embodiment, however, receiver 102 includes a synchronization system 103 employing differentiator-based antenna switching for timing recovery in accordance with the present invention, as described in further detail below.

Those skilled in the art will perceive that FIG. 1 does not explicitly depict every component within a receiver system. Only those portions of such a system that are unique to the present invention and/or required for an understanding of the structure and operation of the present invention are shown.

FIG. 2 illustrates in greater detail a synchronization system employing differentiator-based antenna switching for timing recovery according to one embodiment of the present invention. Synchronization system 103 includes two timing recovery loops 200 and 201. Independent carrier recovery mechanisms are utilized since separate tuners are employed with antennae 101a and 101b.

Each timing recovery loop 200 and 201 includes a sample rate converter (SRC) 202 and 203 coupled to inputs 104 and 105, respectively, receiving wireless signals from one of antennae 101a and 101b. The output of sample rate converters 202 and 203 are passed to carrier recovery (CR) units 204 and 205, respectively, the outputs of which are connected to square root raised cosine (SQRC) filters 206 and 207. The outputs of square root raised cosine filters 206 and 207 are passed to timing recovery (TR) units 208 and 209, which generate control signals for controlling sample rate converters 202 and 203 to complete timing recovery loops 200 and 201.

Sample rate converters 202 and 203 require input from the timing recovery unit(s) 208 and/or 209 for proper operation, but the timing recovery loops 200 and 201 may fail in poor channel conditions so that a form of diversity is beneficial to the timing recovery algorithm. While signal amplitude and symbol arrival times may vary as a result of multipath propagation, inter-symbol timing is unlikely to be affected. Thus, the timing recovery error for either timing recovery loop 200 or 201 may be employed for the other timing recovery loop with, at most, the addition of some delay factor.

In the present invention, the timing recovery error from timing recovery units 208 and 209 are passed through high pass filters (HPF) 210 and 211, which are differentiators which may be implemented by a simple one tap feedback filter. The outputs of high pass filters 210 and 211 provide a measure of how well the respective timing recovery loop 200 or 201 has converged. If a timing recovery loop has converged, the output of a differentiator operating on that output will be constant (that is—the differentiator output should tend towards zero for a well converged system). However, if the timing recovery loop has not converged, then the timing recovery error wanders over a large range.

In the present invention, a control unit 212 receives the differentiated outputs of high pass filters 210 and 211 and determines whether the magnitude of either output has dropped below a predefined threshold Δ. If the magnitude of either output drops below the threshold value Δ, the respective timing recovery loop 200 or 201 is selected as the "master" timing recovery loop and the error value produced by the corresponding timing recovery unit 208 or 209 is selected for controlling both sample rate converters 202 and 203. Multiplexer 213, under the control of control unit 212, passes the output of the selected timing recovery unit 208 or 209 to both sample rate converters 202 and 203. Sample rate converters 202 and 203 then utilize the received timing recovery error value to adjust processing of received wireless signals from inputs 104 and 105.

In operation, the system 103 is initialized in "independent" mode, with each of the timing recovery loops 200 and 201 running independently on each antenna input 104 and 105 and multiplexer 213 passing the output of each timing recovery unit 208 and 209 to the sample rate converter 202, 203 within the corresponding timing recovery loop 200 and 201, respectively. When the magnitude of the differentiated output of either high pass filter 210 or 211 drops below the threshold value Δ, the timing recovery error from that timing recovery loop 200 or 201 is selected to control both timing recovery loops 200 and 201. If the timing recovery loop synchronization lock is lost, then the control unit switches to the other timing recovery loop as the master. Control unit 212 may optionally receive input from segment sync detect units 213 and 214 for this purpose.

Of course, numerous variations of the operational scheme described above may be alternatively employed. For example, the control unit 212 may periodically re-evaluate the outputs of high pass filters 210 and 211 after selecting one of the timing recovery loops 200 or 201 as the "master," and either select the other timing recovery loop or continue to utilize the current timing recovery loop depending on the result. Moreover, if the timing recovery error of the current "master" timing recovery loop 200 or 201 rises above the threshold value Δ for any reason, the system 103 may be returned to "independent" mode with both timing recovery loops 202 and 203 running independently on the respective antenna input 104 and 105. Similarly, when the timing recovery loop lock is lost for a current "master" timing recovery loop, the system may revert to independent mode rather than simply switching directly to the other timing recovery loop.

FIG. 3 is a high level flow chart for a process of differentiator-based antenna switching for timing recovery according to one embodiment of the present invention. The antenna switching process 300, implemented by synchronization system 103 depicted in FIG. 2, begins with the two timing recovery loops being started and running independently on the inputs from the respective antennae (step 301). The timing errors for both loops are then separately computed (step 302) and differentiated, and the differentiated results are compared to a predefined threshold (step 303) to determine if the rate of change for either error has fallen below that predefined threshold, indicating convergence within the respective timing recovery loop. If not, the process returns for further calculation of timing error and differentiation. If so, however, the process selects the timing recovery loop having a differentiated timing error less than the threshold as a "master" timing recovery loop (step 304), employing the timing error from that loop for feedback within both timing recovery loops.

A determination of whether the loop lock has been lost is then made (step 305), and either the determination is repeated (step 305), or the other timing recovery loop is selected as the master (step 306). The process continues indefinitely until interrupted by an external process.

The present invention applies antenna diversity to timing recovery, specifically to antenna selection and/or switching for timing recovery. Differentiated timing recovery errors for both antennae are employed to chose which antenna input to employ in timing recovery and synchronization. The synchronization system thus depends only on the antenna which sees the best channel, rather than on the antenna which sees the worst channel or some combination of the best and worst channels. The probability of getting a timing recovery loop lock for an ATSC receiver utilizing timing recovery-based antenna switching in a dual antenna system is much higher than using some combination of both timing recovery loop errors.

Although the present invention has been described in detail, those skilled in the art will understand that various changes, substitutions and alterations herein may be made without departing from the spirit and scope of the invention it its broadest form.

What is claimed is:

1. A synchronization system for differentiator-based switching between timing recovery errors within a dual antenna receiver comprising:
   first and second timing recovery loops, each coupled to a different antenna input;
   at least one differentiator receiving timing errors from each of said first and second timing recovery loops, said at least one differentiator determining rates of change for said timing errors; and
   a control mechanism employing said rates of change to select a timing error produced by one of said first and second timing recovery loops to be utilized in synchronizing both said first and second timing recovery loops with received signals.

2. The synchronization system as set forth in claim 1 wherein said control mechanism further comprises:
   a control unit comparing each said rate of change to a predefined threshold; and
   a multiplexer capable of selectively passing a timing error from either of said first and second timing recovery loops to feedback points within both of said first and second timing recovery loops,
   said control unit selecting said timing error produced by one of said first and second timing recovery loops based on said comparison of each said rate of change to said predefined threshold and causing said multiplexer to pass said selected timing error to said feedback points within both of said first and second timing recovery loops.

3. The synchronization system as set forth in claim 2 wherein said first and second timing recovery loops each further comprise:
   a sample rate converter sampling a corresponding antenna input and forming said feedback point for said timing recovery loop, said sample rate converter employing said selected timing error to control sampling of said corresponding antenna input.

4. The synchronization system as set forth in claim 3 wherein said first and second timing recovery loops each further comprise:
   a timing recovery unit computing a timing error for said timing recovery loop and passing said timing recovery error to said multiplexer and said at least one differentiator.

5. The synchronization system as set forth in claim 4 wherein said first and second timing recovery loops each initially receive said timing error computed by said timing recovery unit within said timing recovery loop until said rate of change for said selected timing error falls below said predefined threshold.

6. The synchronization system as set forth in claim 4 wherein control unit switches to a timing error produced by an other of said first and second timing recovery loops upon loss of synchronization lock by said timing recovery loop producing said selected timing error.

7. The synchronization system as set forth in claim 4 wherein said first and second timing recover y loops each further comprise a carrier recovery unit and a signal filter.

8. A receiver comprising:
   first and second antenna inputs; and
   a synchronization system for differentiator-based switching between timing recovery errors, said synchronization system comprising:
      first and second timing recovery loops, each coupled to a different antenna input;
      at least one differentiator receiving timing errors from each of said first and second timing recovery loops, said at least one differentiator determining rates of change for said timing errors; and
      a control mechanism employing said rates of change to select a timing error produced by one of said first and second timing recovery loops to be utilized in synchronizing both said first and second timing recovery loops with received signals.

9. The receiver as set forth in claim 8 wherein said control mechanism further comprises:
   a control unit comparing each said rate of change to a predefined threshold; and
   a multiplexer capable of selectively passing a timing error from either of said first and second timing recovery loops to feedback points within both of said first and second timing recovery loops,
   said control unit selecting said timing error produced by one of said first and second timing recovery loops based on said comparison of each said rate of change to said predefined threshold and causing said multiplexer to pass said selected timing error to said feedback points within both of said first and second timing recovery loops.

10. The receiver as set forth in claim 9 wherein said first and second timing recovery loops each further comprise:
    a sample rate converter sampling a corresponding antenna input and forming said feedback point for said timing recovery loop, said sample rate converter employing said selected timing error to control sampling of said corresponding antenna input.

11. The receiver as set forth in claim 10 wherein said first and second timing recovery loops each further comprise:
    a timing recovery unit computing a timing error for said timing recovery loop and passing said timing recovery error to said multiplexer and said at least one differentiator.

12. The receiver as set forth in claim 11 wherein said first and second timing recovery loops each initially receive said timing error computed by said timing recovery unit within said timing recovery loop until said rate of change for said selected timing error falls below said predefined threshold.

13. The receiver as set forth in claim 11 wherein control unit switches to a timing error produced by an other of said first and second timing recovery loops upon loss of synchronization lock by said timing recovery loop producing said selected timing error.

14. The receiver as set forth in claim 11 wherein said first and second timing recovery loops each further comprise a carrier recovery unit and a signal filter.

15. A method differentiator-based switching between timing recovery errors within a dual antenna receiver comprising:
    coupling first and second timing recovery loops to different antenna inputs;

determining rates of change for timing errors from each of said first and second timing recovery loops; and employing said rates of change to select a timing error produced by one of said first and second timing recovery loops to be utilized in synchronizing both said first and second timing recovery loops with received signals.

16. The method as set forth in claim 15 wherein said step of employing said rates of change to select a timing error produced by one of said first and second timing recovery loops to be utilized in synchronizing both said first and second timing recovery loops with received signals further comprises:

comparing each said rate of change to a predefined threshold; and selectively passing a timing error from either of said first and second timing recovery loops to feedback points within both of said first and second timing recovery loops, wherein said timing error produced by one of said first and second timing recovery loops is selected based on said comparison of each said rate of change to said predefined threshold and said selected timing error is passed to said feedback points within both of said first and second timing recovery loops.

17. The method as set forth in claim 16 further comprising:

sampling each antenna input within a respective timing recovery loop; and employing said selected timing error to control said sampling.

18. The method as set forth in claim 17 further comprising:

computing a timing error for each said timing recovery loop and passing said timing error to a control mechanism selecting a timing error to control said sampling.

19. The method as set forth in claim 17 further comprising:

initially receiving, within each of said first and second timing recovery loops, said timing error computed by a timing recovery unit within said timing recovery loop until said rate of change for said selected timing error falls below said predefined threshold.

20. The method as set forth in claim 17 further comprising:

switching to a timing error produced by an other of said first and second timing recovery loops upon loss of synchronization lock by said timing recovery loop producing said selected timing error.

* * * * *